(12) United States Patent
Giese et al.

(10) Patent No.: US 7,244,911 B2
(45) Date of Patent: Jul. 17, 2007

(54) ALIGNMENT MECHANISM FOR A WELDING TORCH

(75) Inventors: William R. Giese, Beecher, IL (US); Robert Warning, Cedar Lake, IN (US); Jeremy Jansma, South Holland, IL (US)

(73) Assignee: Illinois Tool Works Inc., Glenview, IL (US)

( * ) Notice: Subject to any disclaimer, the term of this patent is extended or adjusted under 35 U.S.C. 154(b) by 29 days.

(21) Appl. No.: 11/102,444

(22) Filed: Apr. 8, 2005

(65) Prior Publication Data

US 2006/0226134 A1 Oct. 12, 2006

(51) Int. Cl.
*B23K 9/00* (2006.01)

(52) U.S. Cl. .............................. 219/137.31; 219/125.1

(58) Field of Classification Search ........... 219/137.31, 219/137.63, 137.9, 125.1; 901/42
See application file for complete search history.

(56) References Cited

U.S. PATENT DOCUMENTS 3,813,512 A * 5/1974 Nordgren .................... 219/158
5,451,117 A * 9/1995 Lajoie ......................... 403/356
5,866,874 A * 2/1999 Haczynski et al. ..... 219/137.31

* cited by examiner

*Primary Examiner*—Kevin P. Kerns
(74) *Attorney, Agent, or Firm*—Fletcher Yoder

(57) ABSTRACT

In accordance with one exemplary embodiment, there is provided a welding torch that includes features facilitating aligned assembly of various components of the welding torch with respect to one another. For example, the welding torch includes a nipple that carries a pin member extending from both an inner peripheral surface and an outer peripheral of a sleeve of the nipple. This pin engages with a slot on a coupling member and a slot on a neck assembly, thereby facilitating proper alignment of the neck assembly, coupling member, and nipple with respect to one another. Moreover, the engagement between the pin member and the slots block pivotal displacement of neck assembly, coupling member, and neck assembly with respect to one another. Advantageously, the use of a single pin member for both slots presents a more judicious construction, leading to reduced manufacturing costs, for instance.

29 Claims, 3 Drawing Sheets

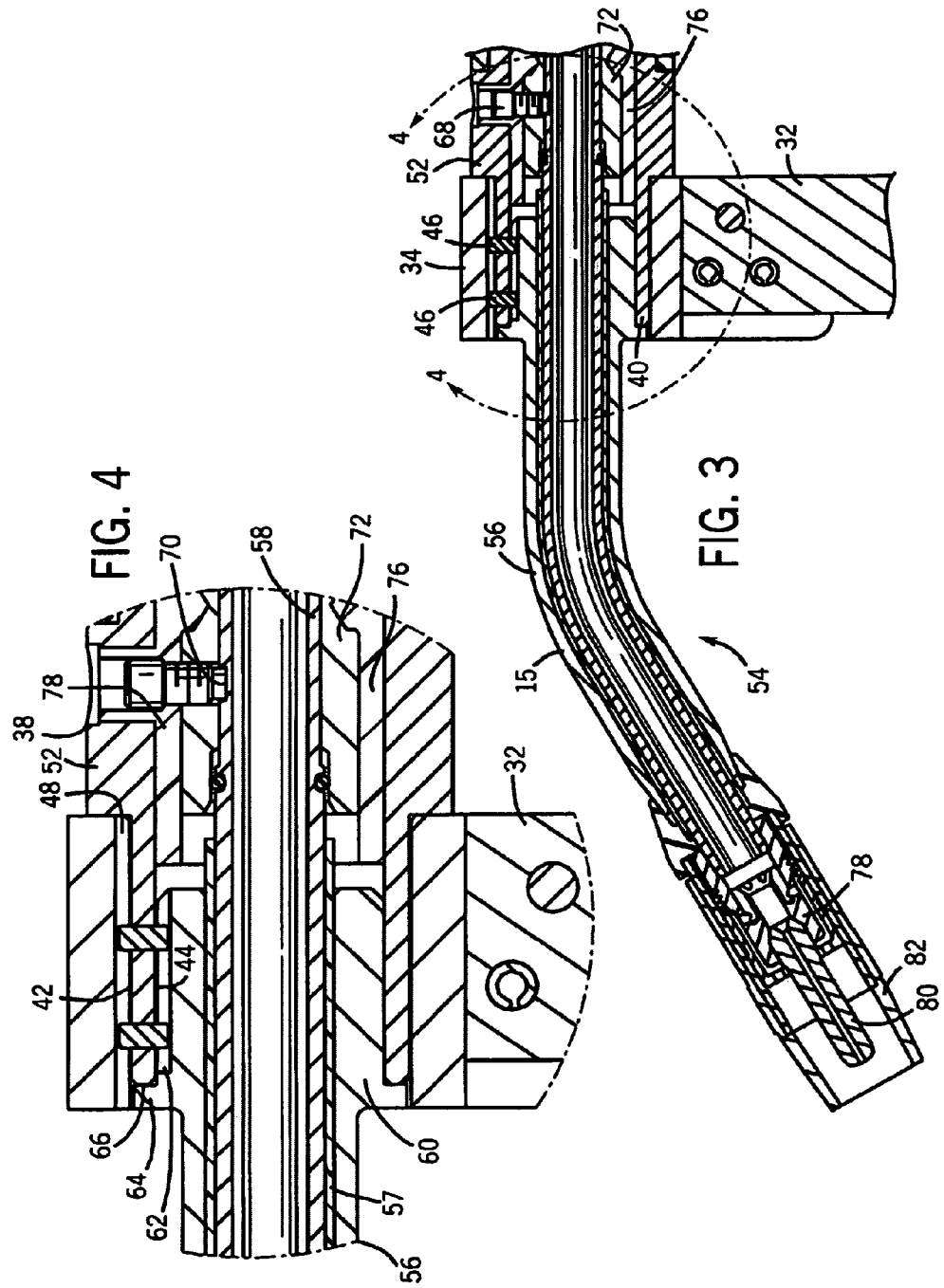

ALIGNMENT MECHANISM FOR A WELDING TORCH

BACKGROUND

The present invention relates generally to welding devices and, more particularly, to methods and apparatus for securing and aligning various components of a welding torch with respect to one another.

A common metal welding technique employs the heat generated by electrical arcing to transition workpieces to a molten state, for welding the workpieces together. One technique that employs this arcing principle is wire-feed welding. At its essence, wire-feed welding involves routing current from a power source and into a wire electrode that is brought into close proximity with the workpieces. When close enough, current arcs from the wire electrode to the workpiece, completing a circuit and generating sufficient heat to weld the workpieces to one another. Often, the wire electrode is consumed and becomes part of the weld itself. This technique is commonly referred to in the industry as gas metal arc welding (GMAW or MIG).

In many industrial settings, such as production facilitates, automation techniques are married with wire-feed welding devices, to improve manufacturing processes, for instance. As one example, robotic assemblies are often utilized to direct the wire-feed welding device to the appropriate position with respect to the workpiece. That is, the articulateable robotic assembly moves a welding torch of the welding system to a desired position or set of positions with respect to the workpiece. This pattern of movement of the robotic assembly and, resultantly, the welding torch is typically defined by a programmed routine. And this movement pattern is oft repeated, as is the case for workpieces moving on an assembly line, for instance.

Because the movements of the welding torch are often automated, errors in alignment of its various components can lead to improper positioning of the weld on the workpiece, for instance. In other words, the automated system, because of misalignments, may perform a welding operation on a workpiece at the wrong location. Additionally, improper installation of the various components of the welding torch can lead to undesirable impacts of the welding torch with surrounding environmental structures. Indeed, certain clearances may not be sufficient if the welding torch is assembled in a manner that deviates from what is expected by the automation program, for instance.

Unfortunately, various events can lead to improper positioning of the welding torch with respect to the remainder of the system. Over a period of time, movement of the welding torch can cause its various components to shift with respect to one another, for instance. Moreover, a technician, during installation or maintenance, may install the various components of the welding torch improperly, leading to a discrepancy between the position of the welding torch expected by the automated system and the actual position of this torch.

Accordingly, there exists a need for an improved welding torch and, more particularly, a need for improved apparatus and methods for assembly and alignment of various components of the welding torch with respect to one another.

BRIEF DESCRIPTION

In accordance with one exemplary embodiment, the present invention provides a welding torch that includes various features that facilitate securement and alignment of various components thereof. The exemplary welding torch includes a coupling member that has an interior surface that defines a central aperture that extends through this member. The coupling member also has a slot that is located in the interior surface and that is open at a first end. The exemplary torch also includes a nipple that has a sleeve and a pin member that protrudes with respect to both an inner and outer surface of the sleeve. Furthermore, the exemplary torch has a neck assembly that includes a second slot.

When assembled, the first and second slots of the coupling member and neck assembly, respectively, engage with the pin member of the nipple. Indeed, in the exemplary embodiment, the same pin member engages with both the first and second slots. Advantageously, this judicious use of the pin member mates the neck assembly, coupling member and nipple at a desired orientation with respect to one another. That is to say, the use of a unitary pin member prevents against misalignment of the neck assembly, the coupling member, and the nipple during assembly and, furthermore, prevents pivotal movement of these components with respect to one another during operation, thus reducing the likelihood of misalignments occurring between these components. Advantageously, the use of a unitary member reduces manufacturing costs, for instance.

DRAWINGS

These and other features, aspects, and advantages of the present invention will become better understood when the following detailed description is read with reference to the accompanying drawings in which like characters represent like parts throughout the drawings, wherein:

FIG. 3 is a cross-sectional view of the welding torch of FIG. 2 along line 3—3; and FIG. 4 is a detail view of the welding torch illustrated in FIG. 3 within line 4—4.

DETAILED DESCRIPTION

Figure 1:
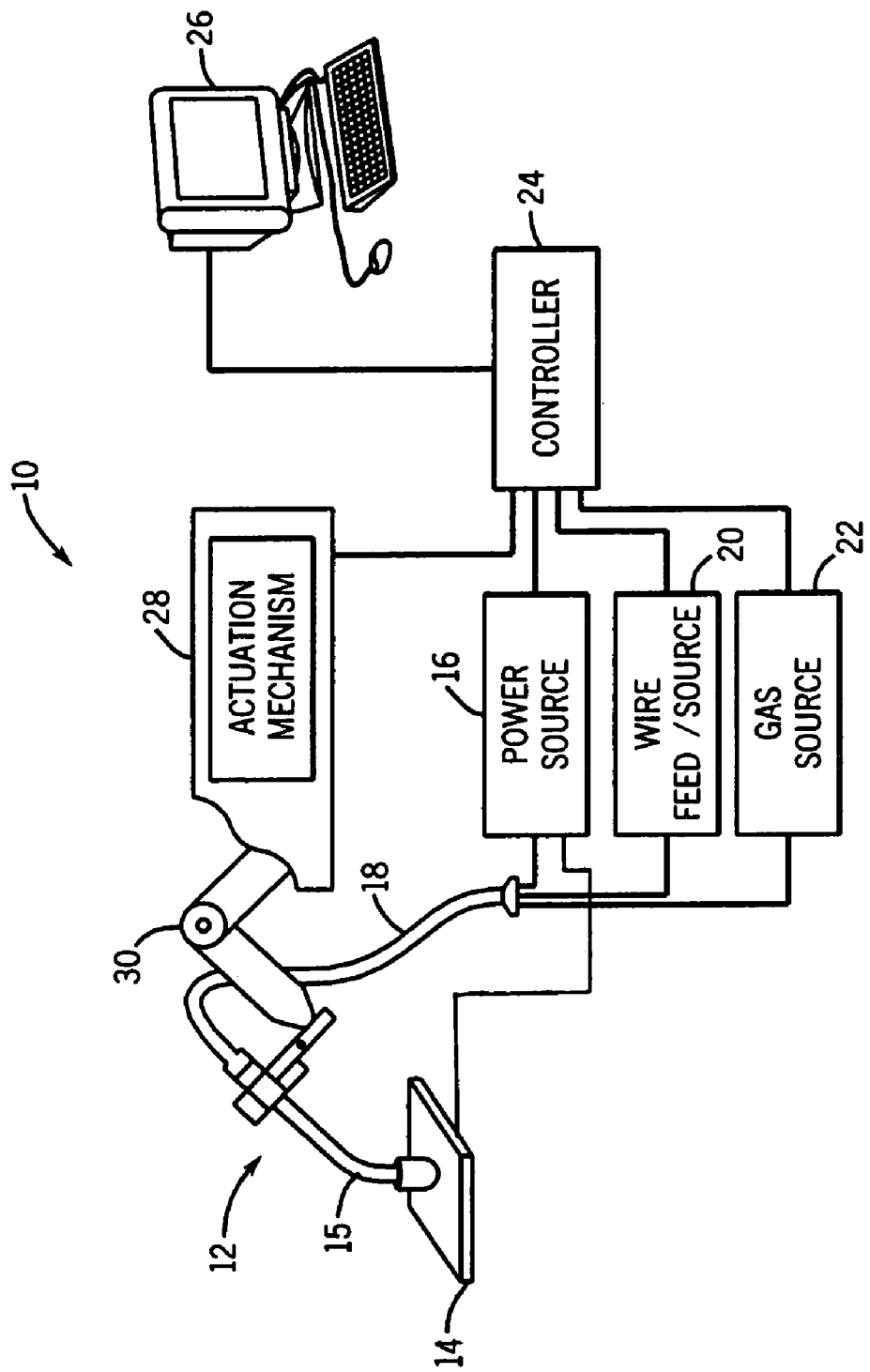
FIG. 1 is a diagrammatical representation of a robotic welding system, in accordance with an exemplary embodiment of the present invention.

Turning to the figures, FIG. 1 illustrates an exemplary gas shielded and wire-feed robotic welding system 10. Prior to continuing, however, it is worth noting that the following discussion merely relates to exemplary embodiments of the present invention. As such, the appended claims should not be viewed a limited to those embodiments discussed herein. Indeed, the present invention provides benefits to both robotic and non-robotic welding systems as well as to both shielded and non-shielded welding devices. In summary, the present invention, which, in a general sense, relates to improved apparatus and methods for component alignment, is applicable to a vast number of systems and devices in which alignment of a resource providing component is a concern and should not be limited to welding systems. Indeed, the present invention provides benefits to fluid spray systems, for example.

Returning to the exemplary welding system 10, it includes a welding torch 12 that defines the location of the welding operation with respect to a workpiece 14. Advantageously, the welding torch 12 includes a bent portion 15 that facilitates positioning of the resource providing components of the welding torch 12 at desired locations with respect to the workpiece 14. For example, placement of the welding torch 12 at a location proximate to the workpiece 14 allows current, which is provided by a power source 16 and routed to the welding torch 12 via a welding cable 18, to arc from the welding torch 12 to the workpiece 14. In summary, this arcing completes a circuit from the power source 16, to the welding torch 12 via the welding cable 18, to a wire electrode, to the workpiece 14, and, at its conclusion, back to the power source 16, generally to Ground. Advantageously, this arcing generates a relatively large amount of heat that causes the workpiece to transition to a molten state, facilitating the weld.

To produce electrical arcing, the exemplary system 10 includes a wire-feeder 20 that provides a consumable wire electrode to the welding cable 18 and, in turn, to the welding torch 12. As discussed further below, the welding torch 12 conducts electrical current to the wire electrode via a contact tip (see FIG. 2), leading to arcing between the egressing wire electrode and the workpiece 14.

To shield the weld area from contaminants during welding and to enhance arc performance, the exemplary system 10 includes a gas source 22 that feeds an inert, shielding gas to the welding torch 12 via the welding cable 18. As discussed in further detail below, the welding torch 12 directs the gas about the weld location. It is worth noting, however, that a variety of shielding materials, including various fluids and particulate solids, may be employed to protect the weld location. Moreover, the present invention is equally applicable to welding techniques in which a shielding material is not employed.

The exemplary system 10 also includes at least one controller 24 to manage the various functions and operations of the system 10. Types of controllers 24 include programmable logic circuits (PLCs), state switches, microprocessors, among other devices. The controller 24 receives inputs from the various components of the system 10 (e.g., welding torch 12, power source 16, wire feeder 20, and gas source 22) and provides appropriate responses to these components. For communications with a user, the controller 24 is coupled to a user interface 26. The user interface 26 displays information received by the controller 24, assisting a user in setting various operational parameters for the system 10, for example. Indeed, a user may directly control (i.e., provide command instructions to) the system 10 via the user interface 26.

The controller 24 also manages the operation of an actuation mechanism 28 that positions the welding torch 12 with respect to workpiece 14, thereby controlling the location of the weld. By way of example, the actuation mechanism 28 includes a hydraulically-actuated robotic arm 30, which is capable of articulating in many directions. And the robotic arm's 30 pattern of movement may be defined by a programmed routine stored in the controller 24 and entered via the user interface 26. As discussed further below, alignment of the various components of the welding torch 12 has particular importance when movements of the welding torch 12 are managed in an automated manner. For example, misalignment or improper installation of various components of the welding torch 12 can lead to welding operations occurring at an unintended and improper location on the work piece 14, for instance.

Figure 2:
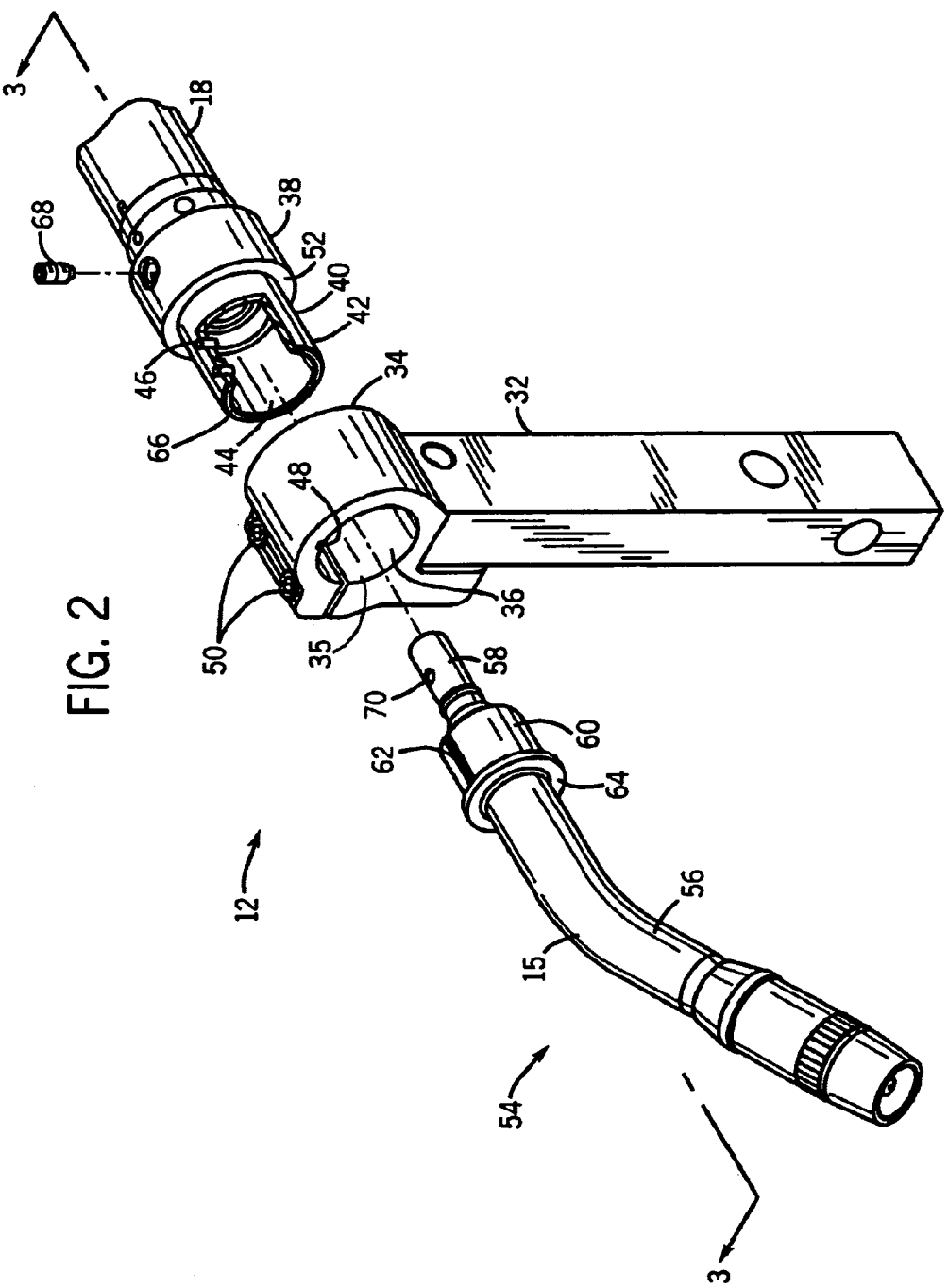
FIG. 2 is an exploded, perspective view of a welding torch of the robotic welding system of FIG. 1.

Turing to FIG. 2, this figure illustrates an exploded, perspective view of the welding torch 12 of FIG. 1. The welding torch 12 includes a mounting arm 32 that is securable to the robotic arm 30 (see FIG. 1). This mounting arm 32 carries a coupling member 34 that includes a receiving aperture 36 extending axially therethrough, from one end of the coupling member 34 to the opposite end. The receiving aperture 36 is defined by an aperture surface 35 and is configured to receive a nipple 38. As illustrated, the nipple 38 has a sleeve 40 on one end, and the opposite end is configured to engage with the welding cable 18. The sleeve 40 has an annular cross-section, which is defined by an outer peripheral surface 42 and an inner peripheral surface 44. As illustrated, the outer peripheral surface 42 matches the arcuate profile of the aperture surface 35 and, as such, the receiving aperture 36, providing for a good fit between the coupling member 34 and nipple 38.

To facilitate alignment and proper installation, the nipple 38 includes pin members 46 that engage with a slot 48 located in the receiving aperture 36. As illustrated, each pin member 46 defines protrusions that extend radially outward from the outer peripheral surface 42 of the sleeve 40 and radially inward from the inner peripheral surface 44. Accordingly, as discussed further below, each exemplary pin member 46 extends through the sleeve 40, protruding with respect to both the outer peripheral surface 42 and the inner peripheral surface 44. It is worth noting that, although illustrated with two pin members 46, the nipple 38 may carry a single pin member 46 or any number of pin members 46. In one embodiment, the pin member 46 may be made of steel.

When the nipple 38 is inserted into the receiving aperture 36, the pin members 46 are only receivable by the open-ended slot 48. That is, the protruding nature of the pin members 46 extends the pin members 46 beyond almost all of the receiving aperture 36, limiting installation of the pin members 46 into the slot 48. Thus, the nipple 38 and coupling member 34 can be assembled at only one orientation, preventing improper assembly by a technician, for instance. Furthermore, the engagement of the pin members 46 with the slot 48 blocks rotation of the coupling member 34 and the nipple 38 with respect to one another. Thus, during operation, the nipple 38 and coupling member 34 respectively maintain their original orientations with respect to one another. Moreover, because the welding cable 18 is secured to the nipple 38, this slot-and-pin engagement also prevents rotational movement of the welding cable 18 with respect to the nipple 38 and the coupling member 34.

Additionally, during insertion, axial movement of the nipple 38 through the receiving aperture 36 is limited by an abutment flange 52, which abuts against an end of the coupling member 34, thereby limiting the axial path of travel of the nipple 38. This abutment is best illustrated in FIG. 4, which is discussed further below. Once the nipple 38 is fully seated with respect to the coupling member 34, a pair of clamping fasteners 50 is tightened to prevent axial separation of the nipple 38 and the coupling member 34 with respect to one another. Specifically, the clamping fasteners 50, when tightened, reduce the diameter of the receiving aperture 36, causing the aperture surface 35 to clamp onto the outer peripheral surface 42 of the nipple 38.

The exemplary welding torch 12 also includes a neck assembly 54 that directs welding resources (e.g., wire electrode, shielding gas, and current) to the desired weld location on the workpiece 14. The illustrated neck assembly 54 has an outer tube 56 that surrounds an inner tube 58. As illustrated, the outer tube 56 presents much of the exterior surface of the neck assembly 54.

To mount the neck assembly 54 with respect to the remainder of the torch 12, the outer tube 56 has a plunger section 60 that is inserted into the interior region of the sleeve 40 of the nipple 38. The plunger portion 60 has a diameter that is slightly smaller than the diameter of the interior region of the sleeve 40, which is defined by the inner peripheral surface 44 of the nipple 38. As such, the plunger portion 60 and the sleeve 40 present a good fit with respect to one another.

To facilitate proper alignment of the neck assembly 54 with respect to the coupling member 34 and, as such, the mounting arm 32, the plunger portion 60 includes a slot 62 that is configured to engage with the pin members 46. Advantageously, the slot 62 and pin members 46 cooperate to limit insertion of the neck assembly 54 with respect to the nipple 38 and coupling member 34 to only one orientation. As discussed further below, the pin members 46, in cooperation with the slot 62 in the plunger portion 60, ensure that the neck assembly 54 can only be assembled with respect to the coupling member 34 and the nipple 38 at this single, desired orientation. Accordingly, the neck assembly 54 cannot be inserted in a misaligned manner with respect to the remainder of the welding torch 12. Moreover, the engagement between the pin members 46 and the slot 62 blocks rotation of the neck assembly 54 with respect to the nipple 38, which, in turn, is pivotally fixed in place with respect to the coupling member 34. As such, the neck assembly 54 remains properly aligned with respect to the remainder of the welding torch 12, even after being subjected to jarring forces often encountered during operation, for instance.

Turning to FIGS. 3 and 4, cross-section views of an assembled, exemplary welding torch 12 are illustrated. Particularly, these figures well illustrate the engagement and relationships between various features of the neck assembly 54, the coupling member 34, and the nipple 38. As illustrated, each of the pin members 46 extends through the sleeve 40 and serves as a protrusion with respect to the inner and outer peripheral surfaces 42 and 44, respectively, of the sleeve 40. That is, each pin member 46 protrudes radially outward from the outer peripheral surface 42 and, also, protrudes radially inwardly from the inner puerperal surface 44. Accordingly, as illustrated, each pin member 46 engages with both the slot 48 of the coupling member 34 and the slot 62 of the plunger portion 60.

Advantageously, employing the same pin member 46 for engagement with both slots 48 and 62 reduces the number of features required for proper alignment of both the nipple 38 and the neck assembly 54 with respect to the coupling member 34 and the remaining components of the welding system, particularly the robotic arm 30. In turn, this judicious use of materials reduces manufacturing costs, for instance. By way of example, the pin members 46 may be inserted by tapping the sleeve 40 and swaging the pin members 46 into the taps.

As an alternative example, the pins for engaging with the slots may be formed by casting protrusions from both the inner and outer peripheral surfaces 42 and 44 of the sleeve 40, the protrusions being located at the same angular position with respect to the annular cross-section of the sleeve 40. For example, in the illustrated assembly, the pin members 46 define protrusions that are all located at zero degrees with respect to the annular cross-section of the sleeve 40, which is transverse to the length of the sleeve 40. If desired, the protrusions may be located at different axial locations on the sleeve 40.

The neck assembly 54 also includes features that define the axial location of the neck assembly 54 with respect to the coupling member 34. For example, the neck assembly 54 includes a neck abutment flange 64 abuts against an end surface 66 of the sleeve 40. This abutment limits the axial path of travel of the neck assembly 54 with respect to the nipple 38 and the coupling member 34 during insertion.

Additionally, the neck assembly includes a notch 70 that is located on the inner tube 58 and that mates with a set-screw 68. The engagement between the set-screw 68 and the notch 70 prevents axial separation of the neck assembly 54 from the nipple 38 and, as such, the remainder of the welding torch 12. It is worth noting that, in the illustrated embodiment, the neck assembly 54 is axially separable from the remainder of the welding torch 12 simply by releasing the set-screw 68. Accordingly, the neck assembly 54 is removable, for the purposes of repair, for instance, without requiring release of the nipple 38 from the coupling member 34.

When assembled, the coupling member 34 and nipple 38 cooperate to mount the welding cable 18 and the neck assembly 54 to the mounting arm 32 and, as such, to the robotic arm 30. Advantageously, the engagement between the pin members 46 and the respective slots 48 and 62 of the coupling member 34 and the neck assembly 54 ensure that the neck assembly 54 and the welding cable 18 are assembled and remain positioned at their respective assigned orientations with respect to the remainder of the welding system 10, particularly the robotic arm 30. (See FIG. 1.) Of particular importance, the engagement between the pin members 46 and the slots 48 and 62 prevents pivotal movement of the neck assembly 54 from its original position. Accordingly, the neck assembly 54 remains at the appropriate orientation with respect to the robot arm 30 throughout operation, for instance.

Once assembled, the welding torch 12 facilitates that transmission and routing of welding resources to the appropriate location on the workpiece 14. (See FIG. 1.) Indeed, the nipple 38 couples the welding cable 18 to the neck assembly 54, which, in turn, directs the appropriate resources to the workpiece 14. For example, electrical current is conducted from the welding cable 18 to conductive element 72 located within the nipple 38. In turn, this conductive element 72 conducts current into the inner tube 58. Advantageously, to prevent electrical current from reaching the outer tube 56, the exemplary neck assembly 54 includes a dielectric layer 51 that is disposed between the inner tube 58 and the outer tube 56. Additionally, to electrically isolate the conductive element 72 from the exterior surfaces of the nipple 38 and the plunger portion 60, an insulative material, such as the illustrated thermoset sleeve 76, surrounds the conductive element 72. This thermoset sleeve 76 ensures that current is only conducted to the inner tube 58, which seats within an interior chamber of the conductive elements 72. From the inner tube 58, current is conducted to a diffuser 78. Seated within the diffuser 78 is a contact tip 80 that conducts electrical current to an egressing wire electrode, which is discussed further below.

The welding torch 12 also facilitates the routing of shielding gas from the welding cable 18 to the weld location. Specifically, gas from the welding cable 18 is routed through the nipple 38 and into the interior region of the inner tube 58. From the interior region of the inner tube 58, the shielding gas is routed into and through the diffuser 78, which includes a series of apertures from which is the shielding gas is emitted. To direct this shielding gas to the appropriate weld location, the neck assembly 54 carries a nozzle 82. Indeed, the nozzle 82 focuses gas from the diffuser 78 to the weld location.

Furthermore, the welding torch 12 facilitates the routing of wire electrode from the welding cable 18 to the welding location. Specifically, wire electrode from the welding cable 18 is routed through the nipple 38 and into the interior region of inner tube 58. From the inner tube 58, the wire electrode is routed into the diffuser 78 and, at its conclusion, egresses from the contact tip 80. As discussed above, the contact tip 80 is electrically energized during operation, and, as such, the egressing wire electrode receives electrical current from the contact tip 80. In the illustrated assembly, the contact tip 80 has an interior channel through which the wire electrode is routed. This interior channel has a diameter that is slightly larger than that of the wire electrode. Accordingly, the wire electrode, when routed through the contact tip 80, comes into contact with the surfaces of the interior channel, thereby energizing the wire electrode.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding torch, comprising:
   a coupling member having a first interior surface that defines a central aperture extending axially through the coupling member from a first end to a second end thereof, wherein the coupling member includes a first slot located on the first interior surface and open at the first end;
   a nipple including a sleeve having an outer peripheral surface and an inner peripheral surface;
   a pin extending through the sleeve and protruding with respect to both the outer and inner peripheral surfaces; and
   a neck assembly having an end portion receivable by the sleeve and having a second slot open at one end;
   wherein engagement of the pin with the first and second slots blocks pivotal movement of the coupling member, the nipple, and the neck assembly with respect to one another.

2. The welding torch as recited in claim 1, comprising a plurality of pins.

3. The welding torch as recited in claim 1, wherein the coupling member is configured to axially secure the nipple via friction between the first interior surface and the outer peripheral surface.

4. The welding torch as recited in claim 1, wherein the pin comprises steel.

5. The welding torch as recited in claim 1, wherein the nipple has a securement portion configured to engage with a welding cable such that the securement portion receives electrical current from the welding cable.

6. The welding torch as recited in claim 1, wherein the pin comprises a unitary member.

7. A welding torch, comprising:
   a coupling member having a central aperture extending axially and completely therethrough, the coupling member having an interior surface that circumscribes the central aperture and having a first slot located on the interior surface;
   a nipple including a first end coupleable to a cable and a second end having an annular cross-section that is generally transverse to a longitudinal axis of the nipple, the annular cross-section being defined by an outer periphery and an inner periphery;
   a first protrusion extending radially outward from the outer periphery and a second protrusion extending radially inward from the inner periphery, wherein the first and second protrusions are located at a same angular position with respect to the annular cross-section; and
   a neck assembly receivable by the nipple and having a second slot;
   wherein engagement of the first protrusion with the first slot blocks pivotal movement of the coupling member and the nipple with one another, and wherein engagement of the second protrusion with the second slot blocks pivotal movement of the neck assembly with respect to the nipple.

8. The welding torch as recited in claim 7, comprising a mounting arm coupleable to a robotic welding device, wherein the coupling member is securable to the mounting arm.

9. The welding torch as recited in claim 7, wherein the cable comprises a welding cable and wherein the first end is configured to engage with the welding cable.

10. The welding torch as recited in claim 9, wherein the neck assembly is electrically coupleable to the welding cable and is configured to receive wire electrode therethrough.

11. The welding torch as recited in claim 7, wherein the first and second protrusions comprise a unitary member.

12. The welding torch as recited in claim 7, wherein the coupling member is configured to clamp onto the nipple to axially secure the coupling member and the nipple with respect to one another.

13. The welding torch as recited in claim 7, comprising a set set-screw configured to axially secure the neck assembly and the nipple with respect to one another.

14. A welding system, comprising:
   a welding cable coupleable to an electrical current source and a wire electrode source; and
   a welding torch coupleable to the welding cable, the welding torch comprising:
      a coupling member having a central aperture extending axially and completely through the coupling member and having an interior surface that circumscribes the central aperture, the interior surface including a first slot;
      a nipple having a first end coupleable to the welding cable and a second end with an annular cross-section generally transverse to a longitudinal axis of the nipple, the annular cross-section being defined by an outer periphery and an inner periphery;
      a first protrusion extending radially outward from the outer periphery and a second protrusion extending radially inward from the inner periphery, wherein the first and second protrusions are located at a same angular position with respect to the annular cross-section; and
      a neck assembly receivable by the central aperture and having a second slot, wherein the neck assembly is configured to route wire electrode therethrough;
      wherein engagement of the first protrusion with the first slot blocks pivotal movement of the coupling member and the nipple with respect to one another, and wherein engagement of the second protrusion with the second slot blocks pivotal movement of the neck assembly with respect to the nipple.

15. The welding system as recited in claim 14, comprising a robotic assembly for positioning the welding torch at a plurality of locations.

16. The welding system as recited in claim 14, comprising a shielding material source, wherein the welding cable routes shielding material from the shielding material source to the welding torch.

17. The welding system as recited in claim 16, wherein the shielding material comprises a fluid.

18. The welding system as recited in claim 14, wherein the welding gun has an arcuate neck assembly.

19. A kit for a welding torch, comprising:
a nipple having a first end coupleable to a welding cable and a second end, wherein the second end includes a sleeve having an inner peripheral surface and an outer peripheral surface;
a first protrusion extending radially outward from the outer peripheral surface at an angular position with respect to an annular cross-section of the sleeve;
a second protrusion extending radially inward from the inner peripheral surface at the angular position with respect to the annular cross-section of the sleeve; and
a neck assembly having a plunger portion configured to be received within the sleeve and having a slot disposed in the plunger portion, wherein the slot is configured to engage with the second protrusion, and wherein the neck assembly is coupleable to the welding cable via the nipple.

20. The kit as recited in claim 19, wherein the first and second protrusions comprise one or more pins.

21. The kit as recited in claim 19, wherein the neck assembly is configured to route wire electrode therethrough.

22. The kit as recited in claim 19, comprising a coupling member having a further slot configured to engage with the first protrusion, the coupling member being configured to receive the sleeve within a central aperture.

23. The kit as recited in claim 19, where the first and second protrusions are located at different axial positions with respect to the sleeve.

24. The welding torch as recited in claim 1, wherein the sleeve comprises a single structure.

25. The welding torch as recited in claim 7, wherein the first and second protrusions comprise a unitary member and wherein the unitary member protrudes through the annular cross-section.

26. The welding torch as recited in claim 7, wherein the annular cross-section comprises a single structure.

27. The welding system as recited in claim 14, wherein the first and second protrusions comprise a unitary member.

28. The welding system as recited in claim 14, wherein the first and second protrusions comprise a unitary member and wherein the unitary member protrudes through the annular cross-section.

29. The kit as recited in claim 19, wherein the first and second protrusions comprise a unitary member.

* * * * *